B. S. VALLE.
NUT LOCK.
APPLICATION FILED MAR. 19, 1909.
961,049.  Patented June 7, 1910.
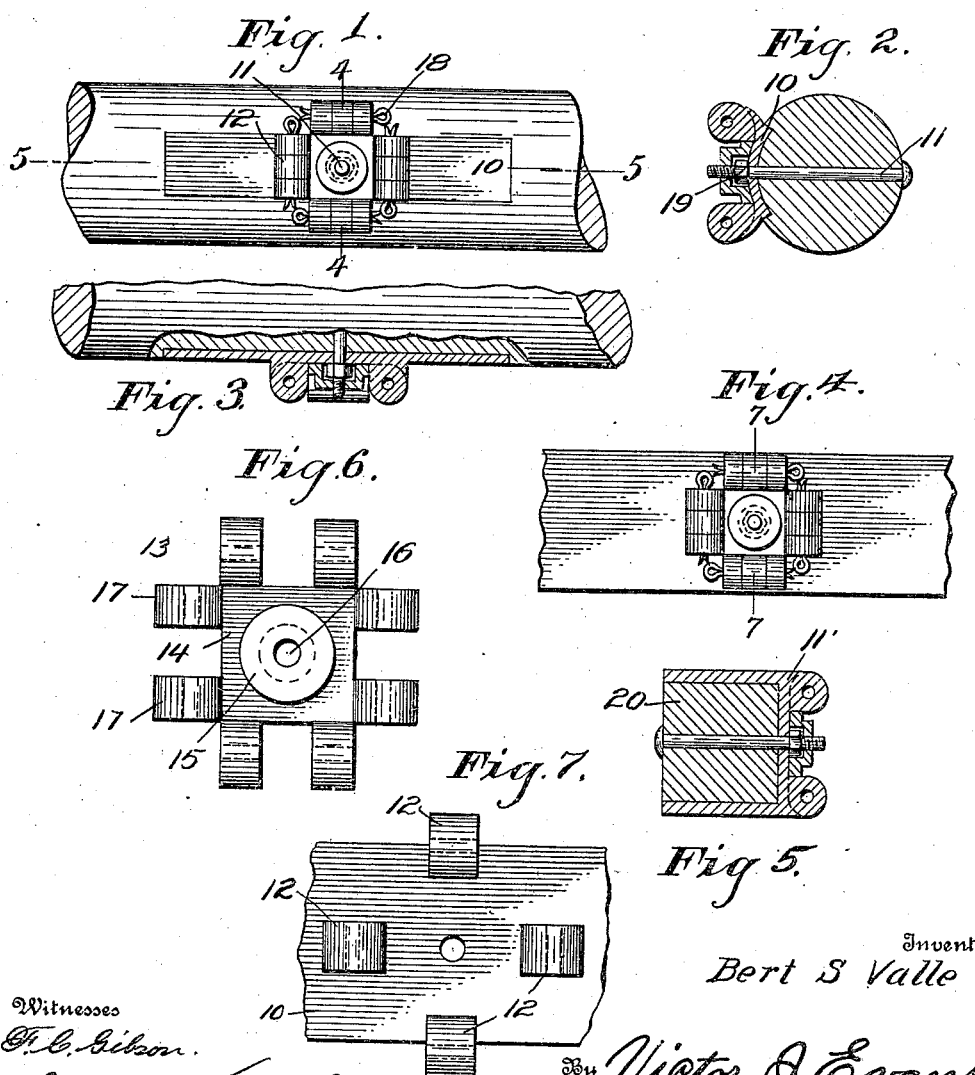
Witnesses
F. C. Gibson.
Inventor
Bert S Valle
By Victor J. Evans
Attorney

UNITED STATES PATENT OFFICE.

BERT S. VALLE, OF COLLBRAN, COLORADO.

NUT-LOCK.

961,049.  Specification of Letters Patent.  Patented June 7, 1910.

Application filed March 19, 1909. Serial No. 484,506.

*To all whom it may concern:*

Be it known that I, BERT S. VALLE, a citizen of the United States, residing at Collbran, in the county of Mesa and State of Colorado, have invented new and useful Improvements in Nut-Locks, of which the following is a specification.

This invention relates to nut locks, and the object of the invention is to provide a device of this character, which is extremely simple in construction, easily applied and which will perform the functions for which it is intended with ease and efficiency.

With the above and other objects in view, which will appear as the description progresses, the invention resides in the novel construction and combination of parts, hereinafter fully described and claimed.

In the accompanying drawing, there has been illustrated simple and preferred embodiments of the device and in which, Figure 1 is a front elevation of a slightly modified form of the device. Fig. 2 is a transverse section upon the line 4—4 of Fig.
3. Fig. 3 is a partial longitudinal section upon the line 5—5 of Fig. 1. Fig. 4 is a side elevation of a still further modified form. Fig. 5 is a transverse sectional view upon the line 7—7 of Fig. 4. Fig. 6 is a front elevation of the securing member shown in Fig. 1. Fig. 7 is a partial front elevation of the face plate shown in Fig. 1.

In Figs. 1 to 3 inclusive of the drawings the numeral 10 designates a face plate. This plate 10 is provided with suitable openings adapted for the reception of threaded bolts 11 and integrally formed upon the plate adjacent the said openings are right angularly disposed perforated ears 12.

The numeral 13 designates the locking member employed in this instance. This member comprises a body portion 14 having a centrally arranged hollow boss or box 15 provided with a central perforation 16 whereby the end of the bolt 11 may be projected.

By reference to Fig. 6 of the drawing it will be noted that the body 14 comprises a substantially square plate of a size approximately equaling the distance between the ears 12 of the plate 10, and the said body 14 has each of its sides or edges adjacent their ends provided with suitable ears 17. These ears 17 are spaced apart a sufficient distance to conveniently engage with the ears 12 of the plate 10, and the said ears are also provided with alining openings adapted to correspond with the openings of the ears 11 whereby cotter pins 18 may be readily inserted through the openings of the ears and the rotation of a nut 19 carried by the bolt 11 is effectively prevented.

In Figs. 4 and 5 is shown a device of a similar structure to that described in connection with Figs. 1, 2, 3, 6 and 7, except that the plate 11' is constructed in a substantially U-shaped cross sectional formation so that the member 20, to which the device is to be applied is effectively reinforced upon three of its surfaces to thoroughly strengthen the same.

It is to be understood that the hollow portions of the bosses 15 have their walls of a shape corresponding to the shape of the nuts which they are adapted to engage, thus firmly and securely locking the said nuts within the hollow bosses.

Having thus fully described the invention what is claimed as new is:

In a device of the class described, a substantially rectangular plate having a central opening and integrally formed ears, said ears being arranged at right angles to each other, a locking member having a body portion provided with a pocket and an opening alining with the opening of the plate, the said locking member having its body substantially squared and the edges of the body provided with a pair of spaced ears adapted to engage with the ears of the plate, and removable pivot members connecting each series of ears upon the locking member with the right angularly disposed ears upon the plate member.

In testimony whereof I affix my signature in presence of two witnesses.

BERT S. VALLE.

Witnesses:
FRED. E. TANNER,
JOSEPH J. PUTNEY.